No. 882,139. PATENTED MAR. 17, 1908.
G. H. BROOKS.
RESTORING ATTACHMENT TO TROLLEY WHEELS AND ELECTRIC SIGNAL
FOR THE SAME.
APPLICATION FILED JUNE 17, 1907.
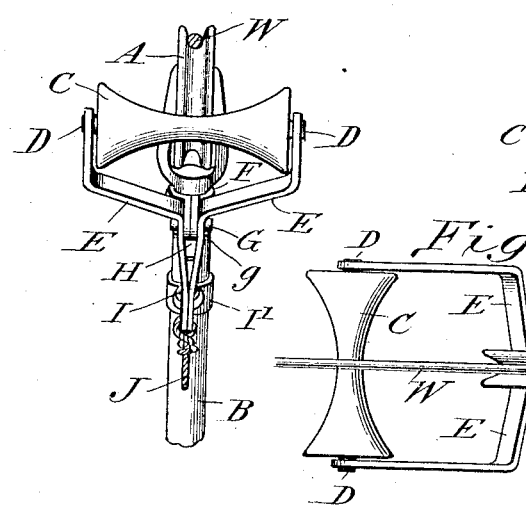
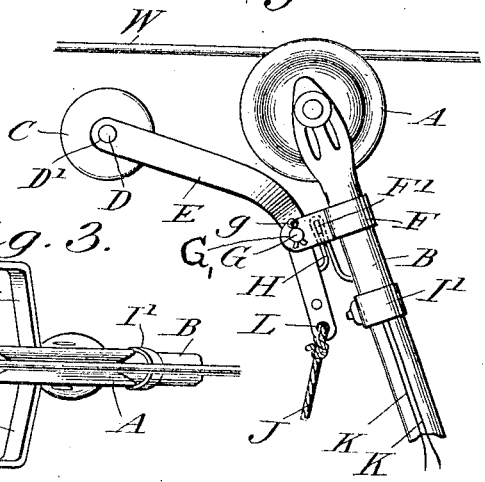
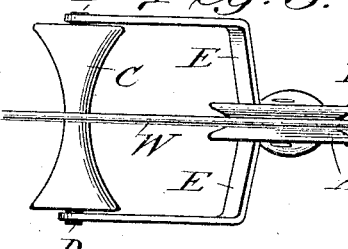
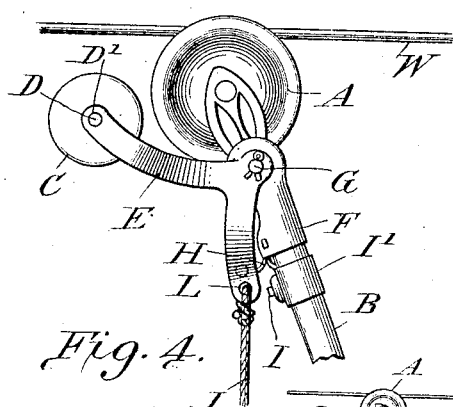
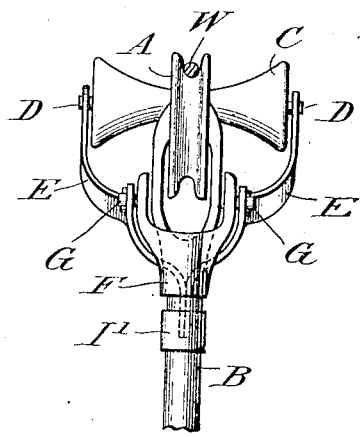
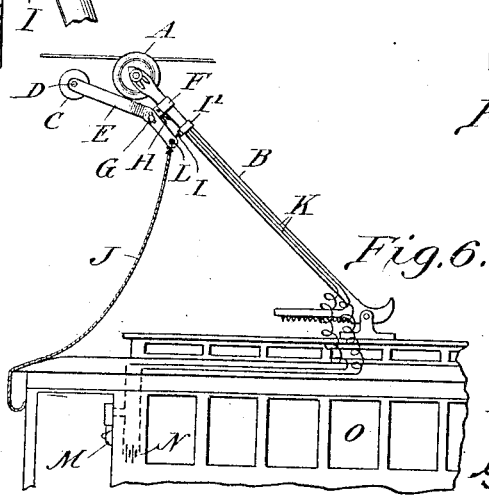
Witnesses:
Inventor,
George H Brooks

UNITED STATES PATENT OFFICE.

GEORGE H. BROOKS, OF LOUISVILLE, KENTUCKY, ASSIGNOR TO GRAUMAN, BECKMAN AND BROOKS, OF LOUISVILLE, KENTUCKY, A COPARTNERSHIP.

RESTORING ATTACHMENT TO TROLLEY-WHEELS AND ELECTRIC SIGNAL FOR THE SAME.

No. 882,139.      Specification of Letters Patent.      Patented March 17, 1908.

Application filed June 17, 1907. Serial No. 379,528.

*To all whom it may concern:*

Be it known that I, GEORGE H. BROOKS, a citizen of United States, residing at 748 East Market street, Louisville, in the county of Jefferson, State of Kentucky, have invented a certain new and useful Improvement in Restoring Attachments to Trolley-Wheels and Electric Signal for the Same, which improvement is fully set forth in the following specification and accompanying drawings.

Referring to accompanying drawings, wherein like reference-letters indicate like parts—Figure 1, is a side elevation of trolley wheel with catch wheel projection attachments, Fig. 2, is a rear view of the same, Fig. 3, is a top plan view of same, Fig. 4, is a side view showing collar with sides extended near the trolley wheel, Fig. 5, is a front view of same, Fig. 6, is a view showing a section of a car with trolley wheel and pole with attachments and insulated wires leading to battery and bell or red light signal for notifying attendant of displacement.

In the drawings, W, indicates the line wire, A, the trolley wheel, B, the trolley pole, C, the catch wheel, D, the journals of catch wheel, $D^1$, perforations for journals, E, E, arms, F, the collar, $F^1$, bolt for securing collar and sear spring, G, bolt for supporting and pivoting arms, $G^1$, perforations for G, H, sear spring for holding arms E, E, out of contact with push button I. $I^1$, is a hard rubber collar. I, is electric push button, J, is rope for attaching to lower ends of arms E, E, K, K, insulated wires connected with button, battery and bell on car, L, perforation for rope. M, bell or ruby light, N, battery, O, the car.

The catch wheel C, is made preferably solid of brass or suitable material, and tapered from the ends towards the center forming a groove, and journals D, D, turned on ends. Said catch wheel C, is revoluble on its own journals D, D, in perforations $D^1$, the arms E, E, are made of steel or suitable material, and are inclined inwardly, and downwardly and are pivoted on short bolts G, said bolts G, are fitted with cotter pins in the end for securing the arms E, E, to the collar F, the said arms E, E, are provided with perforations at D, $D^1$, G, G, and L, L, where rope J, is attached. The collar F, is for attaching to trolley pole B, and supports the arms, E, E, the bolt G, and sear spring H, and bolt $F^1$. The sear spring H, holds lower end of arm E, E, out of contact with the electric push button I, and said push button I, is mounted on nonconducting or hard rubber collar $I^1$, for attaching to trolley pole B, opposite lower end of arms E, E. The wires K, K, being insulated and connected push button I, and leading down trolley pole B, to battery N, and bell or ruby light M. That when the trolley wheel A, is displaced the wire W, is caught by catch wheel C, which causes lower end of E, E, to press button I, forming electric circuit causing bell M, to ring or red light to flash up thus notifying attendant of displacing of trolley contact wheel A, so that by a slight pull of rope J, the trolley wheel A, is lowered and catch wheel C, holding the wire W, is raised above trolley wheel A, when said wire W, slides down inclined side of grooved catch wheel C, thus being centrally located above trolley wheel A, the rope J, is released and the wire W, is naturally caught and contact restored. The said catch wheel C, falls to its natural position below wire W, remaining out of contact, substantially as described.

Fig. 4, shows a variation with arms E, E, shortened and inclined upward at the center, and is pivotal at G, on collar F, said collar has sides extended upwards bringing said arms E, E, nearer the trolley wheel A, and is otherwise the same as Fig. 1, substantially as described.

Having thus described my invention what I claim as new, and desire to secure by Letters Patent, is—

1. A trolley finder and replacer for electric cars, comprising a bell-crank fulcrumed on the rear side of the trolley-pole below the harp, its upper member bifurcated to receive a wheel and its lower member provided with means for attaching a manipulating line, a relatively long, grooved finder and replacer-roller mounted in the upper member of said bell-crank and positioned to the rear of the trolley-wheel, all so arranged that when the manipulating line is drawn downward and backward, the lower member of the bell-crank is drawn backward, thus elevating the replacer-roller mounted in the upper member of the bell-crank to a higher plane than that of the trolley-wheel, so that when the trolley-pole is allowed to rise to replace the trolley wheel the replacer-roller first contacts with the line wire and guides the trolley-wheel to such position vertically under the line wire that when further released it straddles the wire.

2. A trolley finder and replacer, comprising a bell-crank fulcrumed on the trolley-pole below the journals of the trolley wheel, a fork in the upper member of said bell-crank, a relatively long finder and replacer-wheel mounted in said fork, and annunciator circuit, means for closing said annunciator circuit by pressure of said bell-crank, yielding means for normally holding said bell-crank out of contact with said annunciator-closing means, provision for attaching a manipulating-line to the lower member of said bell-crank, all so arranged that when the trolley-wheel leaves the trolley-wire the finder contacts therewith, is pressed downward thereby causing the bell-crank to close the annunciator circuit and notify the attendant, and when the operating line is drawn downward the trolley-wheel is lowered and guided by the replacer-roller, so that when released it finds its place automatically on the wire.

In testimony that I claim the foregoing, I have hereunto set my hand this 31st day of May 1907.

GEORGE H. BROOKS.

Witnesses:
C. A. WALTER,
JOS. J. VOLPERT.